Figure 1:
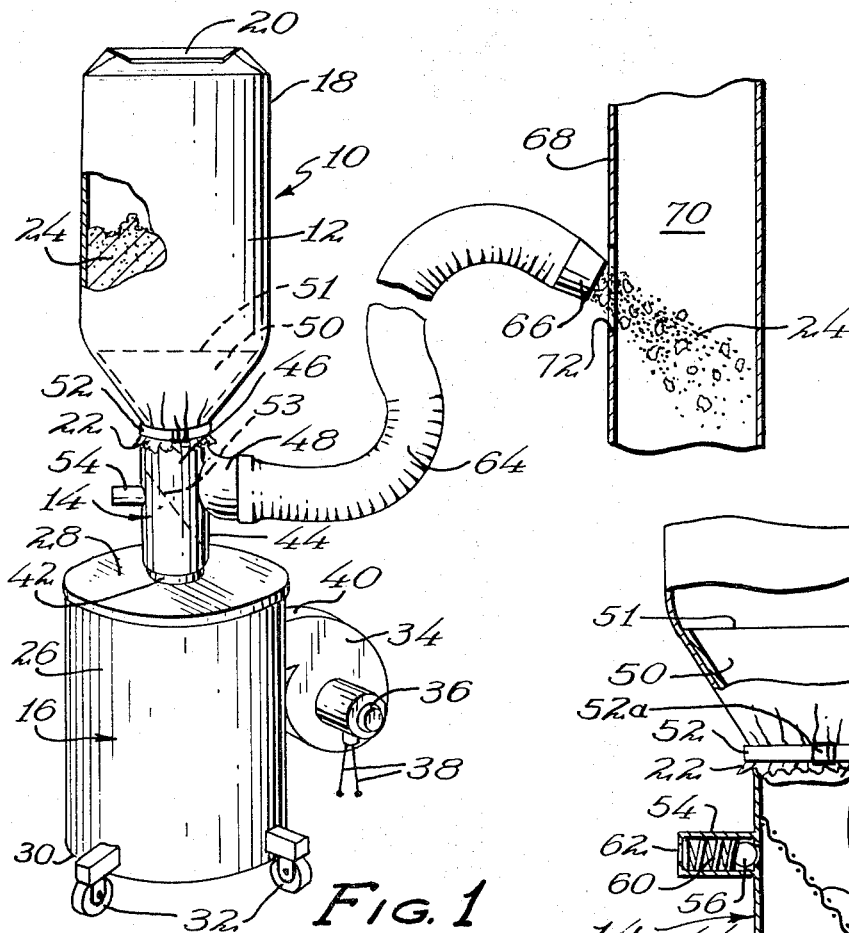

United States Patent [19]

Vance

[11] 4,249,839
[45] Feb. 10, 1981

[54] METHOD AND APPARATUS FOR SUSPENDING AND TRANSPORTING PARTICULATE MATERIAL

[76] Inventor: Joseph E. Vance, 1113 Como Pl., St. Paul, Minn. 55103

[21] Appl. No.: 942,067

[22] Filed: Sep. 13, 1978

[51] Int. Cl.$^3$ .............................................. B65G 53/28
[52] U.S. Cl. .................................... 406/109; 406/120; 406/183; 406/191; 406/197
[58] Field of Search ...................... 302/2 A, 51, 57, 53, 302/27, 39; 406/109, 117, 127, 183, 197, 89, 91, 118, 120, 129

[56] References Cited

U.S. PATENT DOCUMENTS

| | | | |
|---|---|---|---|
| 1,633,561 | 6/1927 | Drew | 302/53 UX |
| 1,971,123 | 8/1934 | Tappen | 302/59 |
| 1,971,852 | 8/1934 | Goebels | 259/4 |
| 2,200,713 | 5/1940 | Erickson et al. | 302/2 A |
| 2,235,542 | 3/1941 | Wenzel | 72/16 |
| 2,874,999 | 2/1959 | Lofgren | 406/120 X |
| 3,758,050 | 9/1973 | Watts et al. | 406/34 X |
| 4,007,694 | 2/1977 | Fowler et al. | 302/53 X |
| 4,111,492 | 9/1978 | Mraz | 406/120 |

Primary Examiner—Robert B. Reeves
Assistant Examiner—Gene A. Church
Attorney, Agent, or Firm—Robert C. Baker

[57] ABSTRACT

A new apparatus for suspending and transporting particulate material is described. The apparatus is particularly useful for transporting and depositing thermal insulation into building spaces. The apparatus includes a conduit junction having a particle inlet conduit for the particulate material, an outlet conduit and an air inlet conduit to supply air under pressure for suspending the particulate material passing into the junction, e.g. from a closed receptacle such as a plastic bag in which the particulate material is stored. The air inlet conduit provides air at superatmospheric pressure to the closed receptacle, thereby placing the stored particulate material and the interior of the receptacle at or above the air pressure in the junction. The particulate material is then able to move into the junction without traversing an air current travelling in the opposite direction. The outlet conduit carries air and particulate material away from the junction to a delivery point. The outlet conduit preferably has connected to it a delivery conduit such as the flexible hose to carry the air and particulate material to a desired location. An air pervious member or screen is preferably mounted within the junction in a suitable location to prevent particulate material from travelling out through the air inlet; and a pressure relief valve is preferably provided to exhaust air exceeding a predetermined pressure.

9 Claims, 6 Drawing Figures

U.S. Patent        Feb. 10, 1981        4,249,839

METHOD AND APPARATUS FOR SUSPENDING AND TRANSPORTING PARTICULATE MATERIAL

THE PRIOR ART

A variety of devices such as venturi effect injectors have been used for moving particulate materials including insulation. In these devices the suction produced in the venturi is used to withdraw the particulate material from its storage location, e.g. in the bottom of a barrel or bin. In this equipment the direction of flow of the moving air stream remains relatively unchanged at the point of introduction of the particulate material, i.e. in the venturi. In addition, many of these devices are complicated, expensive, difficult to handle and require the use of high pressure air. Moreover, most are unsuited for use in the home for do-it-yourself applications using air sources that are readily available to the home owner. Furthermore, the particulate material must in general be dumped from its supply container into a storage bin or hopper. This is time consuming and requires an extra manual step in the operation.

The new apparatus of this invention has numerous advantages. It is low in cost, rugged, and effective in operation even for use by the homeowner. Moreover, it can be used with relatively low pressure air such as the exhaust air of a vacuum cleaner or shop vacuum. In addition, it will withdraw particulate material from its shipping receptacle, e.g. plastic bag, thereby making it unnecessary to empty the bag by hand into a bin or hopper. The invention also provides an effective means for insuring that the receptacle is inflated and distended with air under pressure. This has three advantages. It holds the receptacle at all times in an inverted upright position, it expands the receptacle so as to prevent wrinkles or folds that could prevent particles from falling into the conduit junction and it maintains the air pressure high in the receptacle enough so that the particles do not have to traverse the current of air travelling in the opposite direction to reach the junction. The invention also effectively prevents particulate material from passing out through the air inlet and provision is made for exhausting excess air when the outlet nozzle is shut and the air continues to enter the air inlet.

SUMMARY OF THE INVENTION

A new apparatus for suspending and transporting particulate material such as thermal insulation is described. The apparatus includes a conduit junction, including a particle inlet conduit through which the particulate material enters, an outlet conduit and an air inlet conduit to provide air under pressure within the junction for suspending the particulate material that passes into the junction from a closed supply receptacle such as plastic bag in which the particulate material is stored. The air entering through the inlet conduit keeps the interior of the receptacle air at super-atmospheric pressure. Thus, during operation the particulate material in the receptacle is at or above the air pressure in the junction whereby the particulate material is able to move from the receptacle into the junction without traversing an air current travelling in the opposite direction. The outlet conduit carries both air and particulate material away from the junction toward its final delivery point.

The particle inlet conduit preferably extends upwardly and includes a funnel-shaped end portion. The air inlet conduit preferably but not necessarily extends downwardly and in a typical application is connected to the outlet of a source of air under pressure such as the outlet of a vacuum cleaner. The outlet conduit preferably extends horizontally and has connected to it a delivery conduit such as the flexible hose to carry the air and particulate material to a desired location. An air pervious member or screen is preferably mounted within the junction in a suitable location to prevent particulate material from travelling out through the air inlet; and a pressure relief valve is preferably provided to exhaust air exceeding a predetermined pressure.

The new method used for suspending and transporting the particulate material comprises, providing a conduit junction having a particle inlet conduit, an air inlet conduit and an outlet conduit, fastening the closed supply receptacle to the particle inlet conduit while particulate material remains in the supply receptacle, introducing air under pressure into the junction through the air inlet conduit to provide superatmospheric static air pressure within the closed receptacle. The air travelling through the conduit is allowed to escape through the outlet duct while suspending and transporting the particulate material passing from the receptacle into the conduit junction. In one preferred form of the invention, the particulate material falls by gravity from the receptacle into the particle inlet conduit where it strikes the air stream and is carried through the outlet conduit.

THE FIGURES

FIG. 1 is a perspective view of the invention while being used for filling the walls of a building with insulation, FIG. 2 is a vertical sectional view of the conduit junction on a larger scale, FIG. 3 is a perspective exploded view of another embodiment of the invention utilizing a selector valve, FIG. 4 is a vertical sectional view of the embodiment of FIG. 3 showing the left particle feed duct in use, FIG. 5 is a view similar to FIG. 4 showing the right feed duct in use and, FIG. 6 is a view similar to FIG. 5 showing the selector valve positioned to shut off all flow of particulate material.

DETAILED DESCRIPTION

Referring the drawings, particularly FIG. 1, the new apparatus for suspending and transporting particulate material is indicated generally by the numeral 10. At the top is provided a closed storage and shipping receptacle 12, e.g., a plastic bag containing particulate material. Below the bag and connected to its lower end as seen in FIG. 1 is a conduit junction 14 which will be described in more detail below. The conduit junction 14 is in turn connected to the top or outlet portion of any suitable source of air under adequate pressure to suspend and transport the particulate selected, e.g., the exhaust of a shop vacuum 16 of the type used for heavy duty cleaning.

The receptacle 12 will now be described in more detail. As seen in FIG. 1 the receptacle 12 is in this instance a plastic bag having side walls 18 and a bottom flap seal 20. The mouth 22 of the bag is secured to the upper end of the conduit junction 14 as will be described in more detail below. Within the bag 12 is particulate material 24 of any suitable kind. The term "particulate material" herein is used in a broad sense to refer to any subdivided material having a variety of shapes such as round or irregular particles, crumbs, granules and even elongated material such as strands or fibers or clumps of strands such as fiberglass insulation in either loose fiber form or clumped fiber form. In one practical application of the invention, the particulate material comprises insulation granules such as foamed polystryene particles, expanded vermiculite or other insulating material. Thus, as used herein the term "particulate" is intended to include both granules and particles as well as elongated or fiberous particles.

It will be noted that the receptacle or bag 12 is closed except at the mouth 22 where it is attached to and communicates through the upper end of the conduit junction 14. The term "closed" is used with respect of the receptacle means that the receptacle is closed other than at the point of attachment to the conduit junction where the interior thereof communicates with the interior of the junction.

The receptacle 12 can be other than a flexible bag of relatively air-impermeable walls; but when a suitable bag is attached to the junction 14 several important advantages are obtained. First, particulate material 24 does not have to be transferred out of the receptacle by hand. Second, the flexibility of the bag top enables the bag top to be quickly and easily secured to the top of the junction. This is true regardless of the exact size of the bag. Moreover, since the bag is made of flexible material, a relatively tight, leak proof seal can be obtained between the inverted bag mouth 22 and the junction 14. As a result, superatmospheric pressure can be maintained within the receptacle 12 as will be described more fully below.

While air can be supplied from a variety of sources, it is very convenient particularly for the homeowner engaged in a do-it-yourself project to utilize a vacuum cleaner as an air source. The invention makes possible using relatively low air pressure, e.g. at the pressure exhausted from a vacuum cleaner, but adequate to move the particulate.

The FIG. 1 air-source or air-blower device 16 includes a storage bin 26 of cylindrical form having the top wall 28, the bottom wall 30, supporting wheels 32, and an electrically operated air blower 34 to force air into the bin 26. The blower 34 is operated by a suitable electric motor 36 to which current is supplied through conductors 38 connected to any suitable electric current outlet. The air exhaust from the blower 34 enters the device through a duct 40. Air is exhausted from the device 16 through an air outlet duct 42.

The junction 14 in this case is T-shaped and includes a downwardly extending cylindrical air inlet conduit 44 secured to and communicating with the air outlet 42 of the vacuum cleaner 16. As seen best in FIG. 2 the conduit junction 14 also includes an upwardly extending particle inlet conduit 46 aligned vertically with and positioned diametrically opposite the air inlet 44. The conduit junction 14 also includes a particle outlet conduit 48 which in this instance is positioned horizontally and extends at right angles to the air inlet conduit 44 of the particle inlet conduit 46. At the upper end of the particle inlet conduit 46 is an upwardly extending hopper or funnel 50 having an open top 51 that communicates with the interior of the receptacle 12 to assist the particulate material 24 flow downwardly into the junction 14 when the apparatus is in operation. The mouth 22 of the bag is fastened securely to the particle inlet conduit 46 at a point just below the funnel 50 by a strap or band 52 having a releasable fastener 52a allowing the bag 12 to be quickly removed when empty and easily replaced with a full bag. It will be noted that the lower end of the receptacle 12 is connected to the particle inlet conduit 46 with the receptacle extending upwardly from the junction and being located above the junction. In this way the particles material is free to fall by gravity from the receptacle into the junction.

Figure 2:
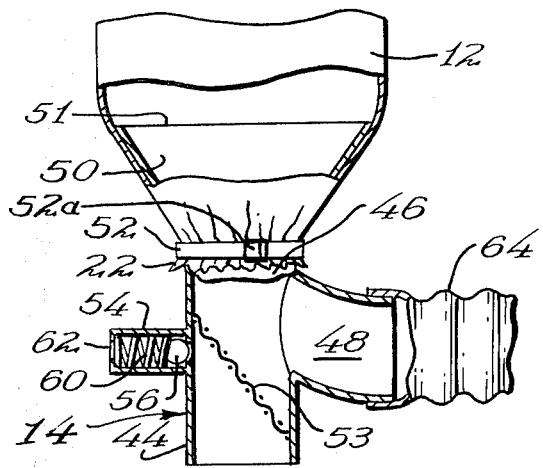

In the interior of the conduit junction 44 is an air pervious member such as a screen 53 positioned in this case diagonally as best seen in FIG. 2 to prevent particulate material entering the junction from passing out through the air inlet 44 when the vacuum cleaner 16 is turned off.

Suitably mounted upon the conduit junction 14 is a pressure relief valve 54 best seen in FIG. 2. Valve 54 includes a generally cylindrical casing, the right end of which is attached to the junction as by solder or adhesive or the like. A moveable valve element 56 such as a ball is normally seated by means of a spring 60 which extends from the left end of the valve adjacent to the air exhaust opening 62 to the ball 56 thereby urging the ball 56 onto its seat in the wall of the junction 14. It will be noticed that the pressure relief valve 54 is located below screen 53. In this way particulate material will be prevented from escaping through the pressure relief valve. Thus, the screen has a dual function; it prevents the partiuclate material from escaping into the vacuum cleaner 16 and also through the pressure relief valve.

The pressure relief valve itself releases excess pressure in the system when the air outlet 48 is shut off or obstructed and the vacuum cleaner continues to operate. Excess pressure in the system could damage the bag 12, cause a seal to break or force the junction 14 off of the vacuum cleaner outlet 42. The predetermined pressure at which the pressure relief valve 54 is set to release air will depend upon the size and application of the invention and the nature of the air source. One skilled in the art will understand that if pressure in the junction is excessive when the outlet conduit 48 in plugged or otherwise shut off, a weaker spring 60 should be used.

Suitably secured to the particle outlet conduit 48 is a particle directing means such as a flexible hose 64. The hose 64 is provided at its outlet and with a directing nozzle 66. When the invention is used for depositing insulation, the nozzle or outlet end 66 is placed proximate to an opening 72 of wall 68 into a building space 70 or other desired delivery point so that the insulating particles 24 expelled through nozzle 66 fill the wall spaces.

Figure 3:
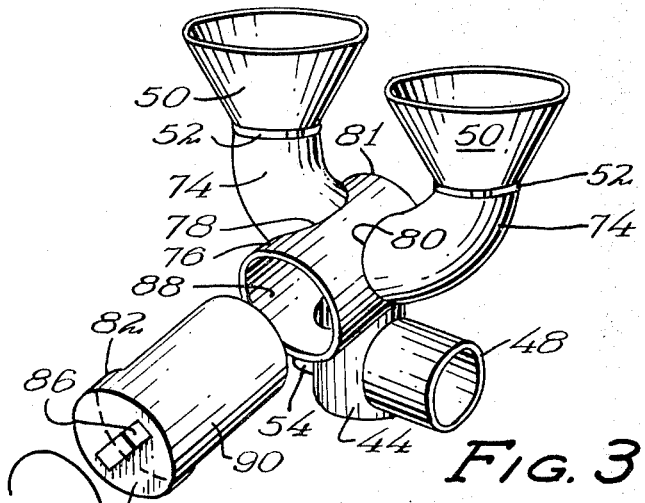
Figure 4:
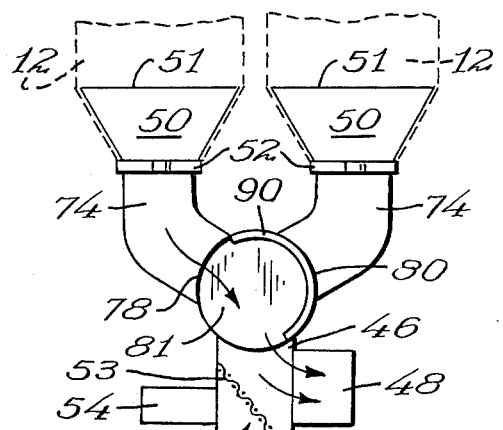
Figure 5:
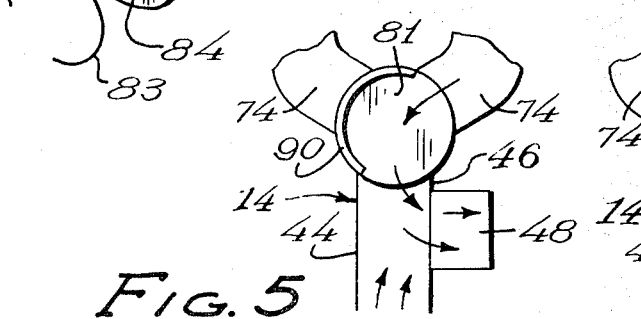

Refer now to FIGS. 3 through 5 which illustrate a modified form of the invention used for selectively and alternately feeding particulate material from a plurality of receptacles 12. The conduit junction 14 is otherwise similar to the conduit junction already described and the same numerals refer to corresponding parts. Secured to the particle inlet conduit 46 is a means for supplying particulate material from one of feed hoppers 50 comprising of a pair of particle feed ducts 74 connecting the lower end of each of two funnels 50 to a particle selector valve 76 which is cylindrical in shape and is provided with a pair of openings 78 and 80 to which the lower ends of the particle feed ducts 74 are rigidly fastened, for example, by soldering or welding. Within the cylindrical bore 88 of selector valve 76 is provided a moveable selector valve element 82 having a cylindrical end portion closest to the observer as seen in FIG. 3 with a handle 86 projecting outwardly to allow the selector valve 82 to be rotated on its central axis. The valve element 82 is provided with a shut off element 90 which has the configuration of a section of cylindrical pipe cut longitudinally. The shut off element 90 as shown in FIG. 4 is placed to obstruct the lower end of the right particle feed duct 74 so that particulate material will enter only through the left particle feed duct. In FIG. 5, particulate material will enter only through the right feed duct 74; and FIG. 6, with the shut off element 90 sealing the upper end of the particle inlet conduit 46, the flow of all particulate material is prevented.

Figure 6:
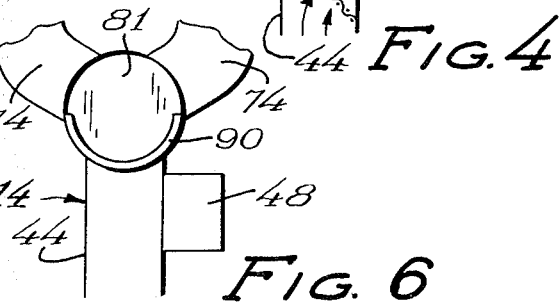

To use the embodiment of FIGS. 3 through 6, a bag 12 of insulation is placed on the right funnel 50 and the selector valve turned to the position FIG. 5 while insulation is deposited through the outlet into the wall space 70. As this is being done, a full bag of insulation is placed on the left funnel 50 of the infeed duct at the left and the band 52 securely tightened. This allows one to operate continuously with the help of an assistant. Thus, the movable valve element 82 can be rotated through 360° to three possible positions as shown in FIGS. 4 through 6. The movable valve element 82 can be securely retained in the casing of valve 76 in any suitable manner, for example by means of a spring clip 83 adapted to snap into a suitable interior recess within the open end of the bore 88.

The new method of suspending and transporting particulate material in accordance with the invention will now be described by reference again particularly FIGS. 1 and 2. The method begins by attaching the bag 12 or other receptacle to the particle inlet 46. This is done by drawing the open mouth 22 of the bag over the funnel or hopper 50 and securing it in place by means of the band 52. The nozzle 66 is then introduced into the wall opening or other desired location where the paticulate material is to be directed and the motor 36 and blower 34 are energized. The device 16 then forces air upwardly through the top upper outlet 42 into the conduit junction 14. As air enters the conduit junction, the static pressure of the air as applied through the particle inlet 46 to the interior of the bag, stretches and extends the bag i.e. puffs it out so that it stands straight up as illustrated in FIG. 1. This also removes all wrinkles and folds in the sides of the bag which if present might interfere with the smooth downward flow of particulate material 24 into the hopper 50. Under these conditions the interior of the bag is at superatmospheric pressure. Particles 24 within the bag are thus free to fall under the influence of gravity into the junction 14; and the air stream travelling upwardly through the junction and passing out through the outlet 48 suspends and transports the particulate material through the particle delivery means 64 to the nozzle 66 and into the wall space 70. It will be noted that since the interior of the receptacle 12 is at superatmospheric pressure, the particulate material 24 will not be forced to travel against a stream of air travelling in the opposite direction as it falls downwardly by gravity into the junction 14. When the nozzle 66 is closed, and the blower 34 continues to operate, excess air pressure within the junction is relieved through the valve 54. This prevents the bag 12 from either being broken or from being blown off the top of the unit.

When continuous operation is desired, the embodiment of FIGS. 3 through 6 is used. The funnels 50 are used alternatively by moving the selector valve to the desired position as mentioned above in connection with the description of FIGS. 4 through 6. As one bag is being emptied, another full bag can be mounted on the unused funnel 50.

It should be noted that in preferred embodiments, the air stream travelling through the junction 14 does not travel in a straight or linear path through the junction but instead changes direction. In the apparatus illustrated, it makes a right angle turn after passing upwardly into the junction 14. In addition, it will be noted that the particles are not drawn out of the receptacle 12 by the flow of air out of the bag but by gravity.

It can also be seen that the conduit junction 14 provides an adaptor or accessory of very low cost that can be used by workmen, homeowners or others for installing insulation on a do-it-yourself basis or otherwise. Besides its simplicity and low cost, the adaptor which comprises the conduit junction and includes a hopper 50 and band 52 will function effectively using low pressure air as exhausted from a vacuum cleaner. It will also be noted that shipping receptacles 12 in which the insulation is transported need not be emptied by hand into a separate container before being blown into the wall.

It is also important to note that the invention is suitable for use with shipping receptacles such as plastic bags secured directly to the conduit junction, through the controlled pressurization of the bag thereby (a) removing all wrinkles and folds for facilitating free flow of material out of the bag, (b) eliminating the flow of particles out of the bag against the flow of air, and (c) preventing the bag 12, which may be fairly easily torn or broken, from being damaged by the applied air pressure. Thus, the invention provides a practical way of transferring particles from bags or other containers into desired locations without using venturi pressures.

While the invention has been described for use particularly in depositing insulation in building spaces, it can be used for variety of other purposes such as suspending and transporting particulate material including food and chemical particles, raw materials such as milled grain, minerals and other particulate materials that will be apparent to those skilled in the art.

What is claimed is:

1. As a new article of manufacture: An adapter for attachment to an upwardly directed air outlet of a portable air generating source to thereby form a base assembly for suspending and transporting particulate thermal insulation from a closed flexible shipment and storage bag directly through a delivery conduit into a building space, said adapter consisting of:

(a) a conduit junction consisting of a downwardly directed air inlet conduit for communicative attachment to an upwardly directed air outlet of a portable air generating source, a particulate inlet conduit positioned in substantial alignment with said air inlet conduit and extending upwardly substantially diametrically opposite said air inlet conduit, and an outlet conduit extending between and at substantially a right angle to said air inlet and particulate inlet conduits, (b) an upwardly directed funnel-shaped extension united communicatively with said particulate inlet conduit, (c) a releasable retaining means for communicatively securing a closed flexible shipment and storage bag of particulate thermal insulation to said funnel-shaped extension in a manner permitting gravity drop of particulate thermal insulation from the bag into said funnel-shaped extension, (d) an air pervious member extending across the inside of said air inlet conduit of said junction to prevent particulate material from passing through said air inlet conduit, and (e) a pressure responsive air release means communicating with the interior of said air inlet conduit upstream from said air pervious member and opening to the atmosphere for permitting air to escape from said junction when the pressure therein exceeds a predetermined level above which rupture of a bag secured to said funnel-shaped extension would be endangered.

2. A method of suspending and transporting particulate thermal insulation from a closed supply receptacle through an outlet conduit into a building space to insulate the same, said method comprising:

(a) providing a conduit junction having an upwardly extending particulate inlet conduit for gravity feed ingress of said particulate insulation thereinto, an air inlet conduit for supplying air under pressure to said junction, and an outlet conduit extending from said junction at a location below said particulate inlet conduit and serving as the conduit for carrying air and particulate insulation away from said junction, (b) communicatively attaching a closed supply receptacle containing particulate insulation to said particulate inlet conduit, (c) introducing an air stream into said junction through said air inlet conduit to provide superatmospheric pressure in said closed supply receptacle to thereby place said particulate insulation therein at a substantially static pressure substantially at or above the pressure in said junction, whereby said particulate insulation falls into said junction from said closed supply receptacle without traversing any substantial stream of air travelling in the opposite direction, (d) suspending and transporting said particulate insulation which falls into said junction away from the same through said outlet conduit with the stream of air exiting from said junction through said outlet conduit, and, (e) delivery said suspended particulate insulation from said outlet conduit through a delivery conduit into a building space to insulate the same.

3. The method of claim 2 wherein said superatmospheric pressure in said closed supply receptacle is maintained below a predetermined maximum pressure to prevent said receptacle from breaking during operation.

4. The method of claim 2 wherein said supply receptacle comprises a flexible bag.

5. A method of continuously transporting particulate material from closed supply receptacles, comprising:

(a) providing a conduit junction having an air inlet conduit for supplying a stream of air thereto, an outlet conduit for transport of air and air entrained particulate material from said conduit junction, two upwardly extending feed ducts for gravity feed drop of particulate material into said conduit junction, and selector valve means for alternately permitting communicative connection of a said inlet feed duct with said conduit junction and blocking such connection for the other said inlet feed duct, (b) connecting communicatively to one of said feed ducts a closed supply receptacle containing said particulate material, (c) adjusting said selector valve means to communicatively connect said one feed duct with said conduit junction for gravity drop of particulate material thereinto, (d) supplying a continuous stream of air to said conduit junction through said air inlet conduit, to thereby entrain particulate material dropping into said conduit junction and transport it entrained in air through said outlet conduit of said conduit junction, (e) connecting communicatively to the other of said feed ducts a closed supply receptacle containing said particulate material, (f) adjusting said selector valve means to communicatively connect said other feed duct with said conduit junction for gravity drop of particulate material thereinto after said particulate material from said receptacle on said one feed duct is exhausted, and (g) continuously replacing any receptacle which is exhausted with a fresh closed receptacle containing said particulate material while said selector valve means is adjusted to communicatively connect said conduit junction with a said feed duct equipped with a receptacle containing a non-exhausted supply of said particulate material.

6. A method of suspending and transporting particulate material from a closed flexible supply bag through an outlet conduit comprising:

(a) providing a conduit junction having an upwardly extending particulate inlet conduit for gravity feed ingress of said particulate material thereinto, an air inlet conduit for supplying air under pressure to said junction, and an outlet conduit extending from said junction at a location below said particulate inlet conduit and serving as the conduit for carrying air and particulate material away from said junction, (b) communicatively attaching a closed flexible supply bag containing particulate material to said particulate inlet conduit, (c) introducing an air stream into said junction through said air inlet conduit to provide superatmospheric pressure in said closed flexible supply bag to thereby place said particulate material therein at a substantially static pressure substantially at or above the pressure in said junction, whereby said particulate material falls into said junction from said closed supply receptacle without traversing any substantial stream of air travelling in the opposite direction, (d) maintaining said superatmospheric pressure in said closed flexible supply bag below a predetermined, maximum pressure to prevent said bag from breaking, (e) suspending and transporting said particulate material which falls into said junction away from the same through said outlet conduit with the stream of air exiting from said junction through said outlet conduit, and, (f) delivering said particulate material from said outlet conduit through a delivery conduit to a desired location.

7. As a new article of manufacture: An adapter for attachment to an upwardly directed air exhaust port of a drum-type vacuum cleaner to thereby form a base assembly for suspending and transporting particulate thermal insulation from a closed flexible shipment and storage bag directly through a delivery conduit into a building space, said adapter consisting of:

(a) a conduit junction consisting of a downwardly directed air inlet conduit for communicative attachment to an upwardly directed air exhaust port of a drum-type vacuum cleaner, a particulate inlet conduit positioned in substantial alignment with said air inlet conduit and extending upwardly substantially diametrically opposite said air inlet conduit, and an outlet conduit extending between and at substantially a right angle to said air inlet and particulate inlet conduits, (b) an upwardly directed funnel-shaped extension united communicatively with said particulate inlet conduit, (c) a releasable retaining means for communicatively securing a closed flexible shipment and storage bag of particulate thermal insulation to said funnel-shaped extension in a manner permitting gravity drop of particulate thermal insulation from the bag into said funnel-shaped extension, and (d) an air pervious member extending across the inside of said air inlet conduit of said junction to prevent particulate material from passing through said air inlet conduit.

8. As a new article of manufacture: An adapter for attachment to an upwardly directed air outlet of an air generating source to thereby form a base assembly for suspending and transporting particulate thermal insulation from a closed flexible shipment and storage bag directly through a delivery conduit into a building space, said adapter consisting of:

(a) a conduit junction consisting of a downwardly directed air inlet conduit for communicative attachment to an upwardly directed air outlet of an air generating source, a particulate inlet conduit positioned in substantial alignment with said air inlet conduit and extending upwardly substantially diametrically opposite said air inlet conduit, and an outlet conduit extending between and at substantially a right angle to said air inlet and particulate inlet conduits, (b) an air pervious member extending across the inside of said air inlet conduit of said junction to prevent particulate material from passing through said air inlet conduit, and (c) a pressure responsive air release means communicating with the interior of said air inlet conduit upstream from said air pervious member and opening to the atmosphere for permitting air to escape from said junction when the pressure therein exceeds a predetermined level above which rupture of a bag secured to said funnel-shaped extension would be endangered, and (d) a control structure fixed to said particulate inlet conduit, said control structure consisting essentially of
 (1) a valve housing fixed in communication with the upper end of said particulate inlet conduit,
 (2) two separate inlet feed ducts communicatively connected to said housing at locations above the communication of said housing with said particulate inlet conduit, each said feed duct having an upwardly directed funnel-shaped extension united in communicative relationship therewith, each said feed duct having releasable retaining means associated therewith for communicatively securing a closed flexible shipment and storage bag of particulate thermal insulation thereto in a manner permitting gravity drop of particulate thermal insulation from the bag into said funnel-shaped extension of said feed duct, and
 (3) a single selector valve within said housing, said valve being at least movable between first and second positions, either said position being such that one said feed duct is in communication with said particulate inlet conduit and the other said feed duct is blocked from communication with said particulate inlet conduit.

9. An apparatus for delivering particulate thermal insulation from a flexible supply bag thereof to spaces in building structures, consisting essentially of:

(a) a drum-type vacuum cleaner having an upwardly directed air exhaust port, (b) a generally T-shaped conduit junction consisting of a downwardly directed air inlet conduit, an upwardly directed particulate inlet conduit substantially diametrically opposite said air inlet conduit, and an outlet conduit substantially at a right angle to said air inlet and particulate inlet conduits, (c) said air inlet conduit being in communication with said air exhaust port of said vacuum cleaner, and extending downwardly from said junction to said air exhaust port, (d) said particulate inlet conduit having a funnel-shaped extension projecting upwardly, (e) a flexible supply bag containing particulate thermal insulation, said bag being closed except for an open mouth, (f) releasable fastening band means securing the open mouth of said flexible supply bag over said funnel-shaped extension of said particulate inlet conduit for gravity fall of the particulate insulation from said bag through said particulate inlet conduits, (g) an air pervious member extending across said air inlet conduit for preventing said particulate thermal insulation from passing through said air inlet conduit, (h) a pressure relief valve at a location upstream from said air pervious member, said valve being adapted to release air from said junction at a predetermined pressure below that causing rupture of said supply bag, and (i) a particulate directing means communicating with said outlet conduit to carry said particulate thermal insulation to building spaces, whereby air entering said junction from said air exhaust port of said vacuum cleaner serves to inflate said flexible supply bag attached to said particulate inlet conduit and maintains the interior thereof at substantially static superatmospheric pressure, thus permitting gravity fall of said particulate thermal insulation therefrom into said junction without said particulate material traversing any substantial stream of air traveling in the opposite direction, and whereby the air stream traveling through said junction and out said outlet conduit suspends and carries said particulate thermal insulation through said particulate directing means into the building spaces.

* * * * *